Nov. 19, 1957     E. L. DROM     2,813,502
APPARATUS FOR SOLDERING ARTICLES
Filed Oct. 12, 1953
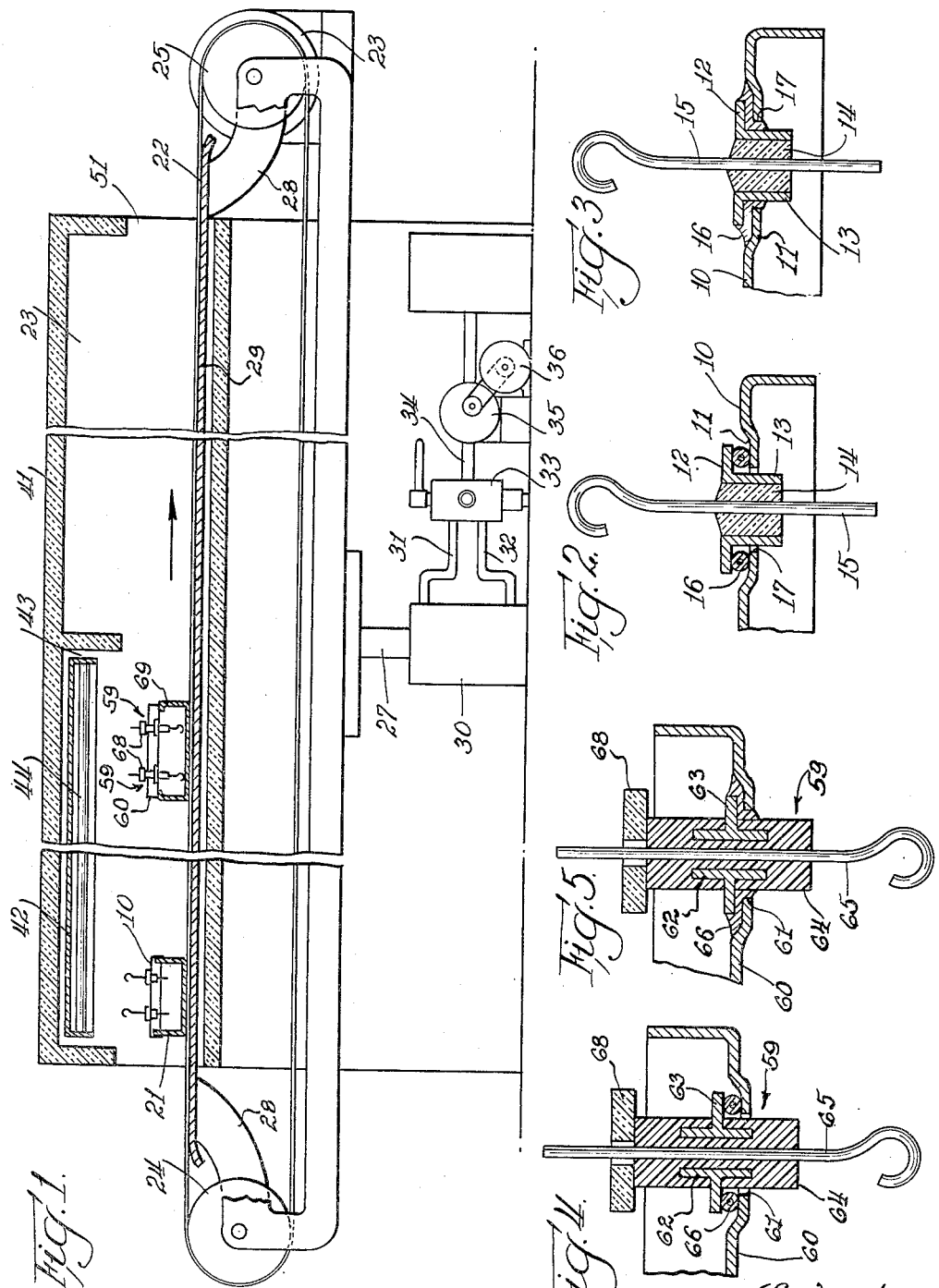
Inventor:
E. L. Drom
By: C. B. Hamilton
Atty.

United States Patent Office 2,813,502
Patented Nov. 19, 1957

2,813,502

APPARATUS FOR SOLDERING ARTICLES

Edwin L. Drom, Brookfield, Ill., assignor to Western Electric Company, Incorporated, New York, N. Y., a corporation of New York Application October 12, 1953, Serial No. 385,366

2 Claims. (Cl. 113—59)

This invention relates to an apparatus for soldering articles, and more particularly to an apparatus for soldering terminals into covers for boxes for electrical apparatus.

In the manufacture of electrical devices of the type including capacitors and networks of inductances and resistances and capacitors, these elements are often impregnated with wax or other moisture-proof material and are potted in containers covered by cover plates which have terminals for the electrical elements passing through the cover plates and insulated therefrom. Where the terminals include leads sealed in glass bushings and the glass bushings are in turn sealed to flanged bushings of Kovar (cobalt, aluminum and iron) it has been very difficult to make good solder joints between the Kovar bushings and the metallic cover plates in one simple operation, particularly where the cover plate includes many such terminals to be soldered thereto. In the past, open flame heating and furnaces have been used, but with these methods there is uneven heating and quite often the glass bushings are cracked in trying to effect the simultaneous soldering of several terminals to the terminal plate. Another method that has been tried is the use of induction heating which also has been very unsatisfactory because of the different frequencies at which Kovar and glass are heated. If the frequency is sufficiently high to heat glass, it does not heat the Kovar and cracking in the glass occurs. While if the frequency is sufficiently low to heat Kovar, the glass is not heated and the glass is cracked. Induction heating also is particularly disadvantageous in attempting to simultaneously solder several terminals to a terminal plate.

Another problem has been present where terminals including plastic portions are soldered to cover plates because of the danger, with past known soldering methods, of melting or charring the plastic portions even though solder melting at temperatures lower than the melting or charring temperatures of the plastic portions is used.

An object of the invention is to provide a new and improved apparatus for soldering.

A further object of the invention is to provide a new and improved apparatus for soldering terminals to covers for boxes for electrical apparatus in a simple single operation.

A further object of the invention is to provide an apparatus for beaming infra-red rays on a terminal plate supporting a plurality of terminals and solder to simultaneously solder all the terminals to the terminal plate.

In a method and an apparatus illustrating certain features of the invention, a cover supporting a plurality of rings of solder and a plurality of terminals having solderable flanged portions is subjected to beamed, infra-red rays to simultaneously heat the flanged portions and the cover sufficiently to melt the solder and bond the terminals and the cover together.

In a method and an apparatus illustrating an alternative embodiment of the invention, a plurality of heat insulating masks are placed over plastic insulating bushings supported by flanged metallic bushings, and the metallic bushings are placed in sockets formed in a cover with rings of solder between the flanges and the cover. Infra-red rays then are beamed down upon the terminal plate to heat the portions of the elements not shielded by the masks.

A complete understanding of the invention may be obtained from the following detailed description of an apparatus forming a specific embodiment thereof, when read in conjunction with the appended drawings, in which:

Fig. 1 is a fragmentary, partially sectional view of an apparatus forming one embodiment of the invention;

Fig. 2 is an enlarged, fragmentary vertical section of the components of an article during one step of a method which utilizes the invention;

Fig. 3 is a view similar to Fig. 2 with the elements of the article shown in a succeeding step of the method;

Fig. 4 is an enlarged, fragmentary vertical section of a portion of an article during one step of an alternative method which utilizes the invention, and Fig. 5 is an enlarged, fragmentary vertical section of the article shown in Fig. 4 at a different step in the method.

Referring now in detail to the drawings, there is shown therein an apparatus for beaming infra-red rays in concentrated form on a tinned, metallic terminal box cover 10 having sockets 11 (Figs. 2 and 3) therein for receiving flanges 12 of bushings 13 composed of Kovar (cobalt, aluminum and iron), which has the same coefficient of heat expansion as glass bushings 14, which are sealed to the bushings 13 in a well-known manner. The glass bushings also are sealed to leads 15 in a well-known manner. The upper surface of the cover 10 is tinned, and the outer surfaces of the Kovar bushings 12 are also tinned for combining with solder. Lengths of rosin-core solder in the form of ring 16 (Fig. 2) are placed in the sockets 11 before the terminals are inserted into holes 17 in the sockets 11, and serve to support the terminals through the flanges 12.

After a cover 10 has been loaded with terminals and the solder rings 16 positioned between the flanges 12 of the bushings 13 and the bottoms of the sockets 11, the assembled structure is placed on a U-shaped support 21 (Fig. 1), which then is placed on a conveyor belt 22 of asbestos or metal driven by an adjustable speed motor 23 supported by a frame. The frame includes brackets 28 supporting a belt-supporting shoe 29. The frame supports an idler pulley 24 and a drive pulley 25, and may be adjusted upwardly or downwardly by a piston rod 27 operable by a cylinder 30 connected by hydraulic lines 31 and 32 to a four-way valve 33 under the control of an operator. The valve is connected by a supply line 34 to a pump 35 driven by an electrically operable motor 36. Thus, an operator may raise or lower the belt 22 to any desired position by starting the motor 36, actuating the valve and stopping the motor when the desired height is reached.

The upper stretch of the belt 22 travels through a housing 41 composed of asbestos or similar heat insulating material and of only slightly greater width internally than the width of the shoe 29 so that the shoe forms an adjustable bottom for the housing 41, and travels first along and beneath a parabolic, focusing reflector 42 mounted in a heating chamber 43. An infra-red ray generating filament 44 mounted in the reflector generates infra-red rays which are beamed by the reflector 42 onto the upper surface of the cover 10 and flanges 12 of the Kovar bushings 13 as well as the upper portions of the glass bushings 14. The conveyor belt 22 carries the covers 10 slowly along under the reflector 42, and the infra-red rays heat the flanges 12 and the cover 10 sufficiently that the solder ring 16 is melted and fused to the bushing 13 and the cover plate 10, the solder substantially filling the socket 11 as illustrated in Fig. 3. After the solder melts, the conveyor belt 22 carries the resulting terminal plate into a cooling chamber, and the soldered joints are cooled down as they travel through the cooling chamber to an exit 51 of the housing 41. The bushings 12 and 14 are heated uniformly by the infra-red rays beamed thereon so that the bushings 14 are not cracked by the heating step. The distance from the top of the covers 10 to the reflector 42 should be such that the focusing beams impinge directly on the portion of the cover having holes therein. In one specific example of the method just described, a six hundred watt filament was used, and cover plate 10 having Kovar-glass terminals was subjected to the concentrated infra-red rays for about two minutes, and the resulting terminal plate was cooled for about two minutes. The distance from the top surfaces of the cover to the filament was about two inches. The terminals were completely soldered and sealed to the cover and none of the glass bushings were cracked.

*Embodiment shown in Figs. 4 and 5*

A cover 60 is provided with holes 61 therein through which are projected plastic bushings 64 of terminals 59. The bushings 64 are molded around leads 65 and between and around brass bushings 62 except for flanges 63 of the bushings 62. The plastic bushings may be composed of a high dielectric strength, high melting point plastic compound, such as, for example, tetrafluoroethylene. Rosin-core solder rings 66 separate the flanges 63 and the cover 60, and support the terminals 59. Washers 68 composed of asbestos or other suitable heat insulating material are placed on the upper ends of the bushings 64 and project laterally beyond the peripheries of the bushings 64 to effectively mask these bushings. The terminal plate thus assembled then is placed on a suitable support 69 similar to the support 21 with the washers 68 above the terminals 59, and the support is placed on the conveyor belt 22, which carries the holder and the terminal plate through the heating chamber 43 and the cooling chamber 48.

As the assembled terminal plate travels through the chamber 43, the infra-red rays beamed directly downwardly by the reflector 42 strike the cover 60 and the flanges 63 of the bushings 62 to heat them to a solder-wettable temperature, and these elements melt the solder rings 66, whereby the terminals 59 settle by gravity downwardly on the cover 60 in desired positions for solidifying the solder in the cooling chamber 48. The washers 68 shield the plastic bushings 64 from the infra-red rays so that these bushings are not melted. The distance between the reflector 42 and the terminals 59 and the speed of the conveyor belt 22 are adjusted beforehand so as to just heat the cover 60 and the flanges 63 to solder melting temperatures, the solder rings being of a material chosen to melt at about 20° F. below the melting temperature of the plastic bushings 64. The solder melts completely and thoroughly wets the adjacent portions of the surfaces of the tinned flanges 63 and the tinned cover 60.

The terminal plate travels from the heating chamber 43 to and through the cooling chamber wherein the solder solidifies to completely seal the joints between the cover 60 and the flanges 63. As the finished terminal plate comes out of the chamber, the terminal plate and the support are removed from the conveyor belt 22, and the masking washers 68 are removed from the terminals.

In one specific example, the bushings 64 were composed of tetrafluoroethylene having a melting point of 390° F., and the solder rings 66 melted at 370° F. The speed of the conveyor belt 22, the intensity of the filament 44 and the spacing between the terminal plate and the reflector 42 were such that the flanges 63 and the cover 60 were heated to a temperature between 370° F. and 390° F. as the terminal plate leaves the chamber 43. The distance between the reflector and the upper face of the cover 60 was about two inches, the period of time that the terminal plate was in the chamber 43 was about two minutes and about six hundred watts was applied to the filament, which was about fourteen inches in length.

The apparatus described hereinabove serves to uniformly solder Kovar-glass terminals to cover plates forming perfect seals therebetween without cracking the glass bushings or destroying the seals between the glass and the leads and the Kovar bushings, and form without exception perfect seals between the flanges 63 and the cover 60 without damage to the plastic bushings 64.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. A soldering apparatus, which comprises a horizontally extending chamber having an entrance opening and an exit opening, an infra-red ray generating filament extending along the upper portion of the chamber between the entrance and exit openings, a parabolic reflector positioned above the filament for beaming downwardly rays from the filament, said rays travelling in substantially parallel paths, a pair of pulleys, a belt mounted on the pulleys, a frame mounting the pulleys in positions such that the upper portion of the belt extends from the entrance opening to the exit opening, and adjustable means for adjusting the frame toward and away from the reflector.

2. A soldering apparatus comprising a base, a heating chamber secured to said base and having an entrance opening and an exit opening, an infra-red ray generating element secured to and extending longitudinally along a portion of the interior surface of the top of said heating chamber and adjacent the exit opening, a parabolic reflector interposed between said generating element and the surface of said heating chamber so that said generating element is superimposed upon the focal axis of said reflector for reflecting the generated rays downwardly along substantially parallel paths, and endless belt conveyor positioned within said heating chamber and extending through the entrance and exit openings for transporting articles beneath said generating element to be heated by the rays emanating therefrom, a double acting hydraulic cylinder secured to said base, a piston rod in said cylinder for supporting the conveyor, a source of hydraulic fluid under pressure secured to said base, and means interconnecting said fluid source and the ends of said cylinder for selectively applying fluid under pressure to either end of said cylinder to move said piston rod and conveyor toward or away from said generating element.

References Cited in the file of this patent

UNITED STATES PATENTS

| 1,991,582 | Sterling | Feb. 19, 1935 |
| 2,262,901 | Murphy | Nov. 18, 1941 |
| 2,282,926 | Bates | May 12, 1942 |
| 2,325,163 | Goodwin et al. | July 27, 1943 |
| 2,402,631 | Hull | June 25, 1946 |
| 2,463,158 | De Lorme et al. | Mar. 1, 1949 |
| 2,685,746 | Margolis et al. | Aug. 10, 1954 |

FOREIGN PATENTS

| 656,482 | France | May 8, 1929 |
| 264,814 | Great Britain | Dec. 22, 1927 |